US008752281B2

United States Patent
Hangleiter et al.

(10) Patent No.: US 8,752,281 B2
(45) Date of Patent: Jun. 17, 2014

(54) METHOD OF CHUCKING A TOOL OR A WORKPIECE AND APPARATUS FOR CARRYING OUT THE METHOD

(75) Inventors: Eugen Hangleiter, Hermaringen (DE); Peter Schenk, Niederstotzingen (DE)

(73) Assignee: Roehm GmbH, Sontheim (DE)

( * ) Notice: Subject to any disclaimer, the term of this patent is extended or adjusted under 35 U.S.C. 154(b) by 171 days.

(21) Appl. No.: 13/002,688

(22) PCT Filed: Jul. 29, 2010

(86) PCT No.: PCT/DE2010/075068
§ 371 (c)(1),
(2), (4) Date: Jan. 5, 2011

(87) PCT Pub. No.: WO2011/038730
PCT Pub. Date: Apr. 7, 2011

(65) Prior Publication Data
US 2012/0119451 A1 May 17, 2012

(30) Foreign Application Priority Data

Oct. 2, 2009 (DE) .................... 10 2009 044 167

(51) Int. Cl.
*B23P 21/00* (2006.01)
*B23Q 15/00* (2006.01)
(52) U.S. Cl.
USPC ......... 29/720; 29/407.05; 29/407.1; 409/234; 279/135
(58) Field of Classification Search
USPC ......... 29/407.01, 407.05, 407.09, 407.1, 709, 29/720; 409/234; 279/126, 134, 135
See application file for complete search history.

(56) References Cited

U.S. PATENT DOCUMENTS

| | | | | | |
|---|---|---|---|---|---|
| 1,595,399 | A | * | 8/1926 | Horton | 279/114 |
| 3,076,662 | A | * | 2/1963 | Kostyrka | 279/4.11 |
| 4,141,564 | A | * | 2/1979 | Peden et al. | 279/4.12 |
| 4,567,794 | A | * | 2/1986 | Bald | 82/1.11 |
| 5,174,179 | A | * | 12/1992 | Hiestand | 82/165 |
| 6,139,028 | A | * | 10/2000 | Kosho | 279/114 |
| 6,629,697 | B1 | * | 10/2003 | Asai et al. | 279/134 |
| 6,973,714 | B2 | * | 12/2005 | Isogai et al. | 29/740 |
| 2003/0014860 | A1 | * | 1/2003 | Isogai et al. | 29/739 |
| 2004/0094910 | A1 | * | 5/2004 | Rehm | 279/126 |
| 2008/0073862 | A1 | * | 3/2008 | Ichimura | 279/134 |
| 2010/0072713 | A1 | | 3/2010 | Taglang | |
| 2010/0119320 | A1 | * | 5/2010 | Inoue et al. | 409/233 |

* cited by examiner

*Primary Examiner* — David Bryant
*Assistant Examiner* — Christopher M Koehler
(74) *Attorney, Agent, or Firm* — Andrew Wilford

(57) ABSTRACT

The invention relates to a method of clamping a tool or a workpiece, using an electric actuator (1) having a housing (2) attached to a work spindle of a machine tool and in which a threaded spindle (3) for moving jaws of a chuck is axially displaceable, and an electric servomotor (4) having a rotor connected with a drive wheel (6) that moves a nut (7) on the threaded spindle (3), a first sensor being associated with the threaded spindle (3) for detecting the axial position thereof, and a second sensor being associated with the spindle nut (7) for detecting the axial position thereof, and including the method step of determining the position of the threaded spindle (3) by the first sensor when a slight axial force occurs due to contact of the clamping jaws with the tool or the workpiece, and continued movement of the spindle nut (7) until a specified sensor difference (12) between the first sensor and the second sensor is determined by the second sensor. The invention further relates to an apparatus for carrying out the method.

6 Claims, 6 Drawing Sheets

METHOD OF CHUCKING A TOOL OR A WORKPIECE AND APPARATUS FOR CARRYING OUT THE METHOD

CROSS REFERENCE TO RELATED APPLICATIONS

This application is the US-national stage of PCT application PCT/DE2010/075068, filed 29 Jul. 2010 and claiming the priority of German patent application 102009044167.0 itself filed 2 Oct. 2009.

FIELD OF THE INVENTION

The invention is a method of clamping a tool or a workpiece, using an electric actuator having a housing attached to the work spindle of a machine tool, and in which is mounted an axially displaceable threaded spindle for moving the clamping jaws of a chuck, and an electric servomotor whose rotor is in drive connection with a drive wheel that moves the spindle nut of the threaded spindle, a first sensor being associated with the threaded spindle for detecting the axial position thereof, and a second sensor being associated with the spindle nut for detecting the axial position thereof, and including the method step of determining the position of the threaded spindle by means of the first sensor when a slight axial force occurs due to contact of the clamping jaws with the tool or the workpiece, and continued movement of the spindle nut until a specified sensor difference between the first sensor and the second sensor is determined by the second sensor. The invention further relates to an apparatus for carrying out the above-described method.

BACKGROUND OF THE INVENTION

An electric actuator is known from US 20100072713 in which an electric motor is used to actuate the chuck associated with a machine tool, i.e. to move clamping jaws. In practice, use of the electric actuator disclosed in DE 10 2006 015 918 has resulted in issues with regard to stroke control that are in need of improvement, since the analog length measurement via the sensor that is used is relatively inaccurate. In addition, it is problematic that use must be made of the motor torque for controlling the achieved clamping force, which is likewise associated with relatively high inaccuracy. Last, the clamping operation has been perceived as being too slow.

OBJECT OF THE INVENTION

The object of the invention, therefore, is to provide a method by means of which the above-referenced problems may be avoided. In addition, it is an object of the invention to provide an apparatus for carrying out the method according to the invention.

SUMMARY OF THE INVENTION

The object is achieved using the method according to the invention. The greatest advantage associated with this method is that it is not necessary to use just torque control for achieving the clamping force; rather, path-dependent control is present due to the fact that movement of the threaded spindle is continued until the specified sensor difference is achieved. The clamping operation itself proceeds more quickly.

Within the scope of the invention, it is preferred that spring assemblies preferably at opposite end faces and tensioned when the specified sensor difference is achieved, are associated with the spindle nut. The advantage of this design is an increase in clamping safety, since the spring assemblies are used as energy storage means and counteract a rapid change in position of the threaded spindle. As a result of the spring assemblies on both sides, the threaded spindle has the same action in both directions.

With regard to safety aspects, it is favorable that the sensor difference be monitored during the clamped state, in particular that the sensor difference is used as a control variable for automatically maintaining the clamping force, since in this manner it is possible to monitor the clamped state with regard to safety aspects over the entire duration of the clamping of a workpiece or a tool. Thus a deviation from the specified sensor difference is reported to the stroke control system typically used with chucks and in the event of deviations from a safe clamped state may be used to deliver a notification or even to cause deceleration until the chuck comes to a standstill.

The portion of the object regarding the apparatus is achieved using an apparatus which is characterized in that an electric actuator is provided having a housing attachable to the work spindle of a machine tool and in which a threaded spindle for moving the clamping jaws of a chuck is mounted in an axially displaceable manner, and which is shiftable by a spindle nut acted on by an electric servomotor whose rotor drives the spindle nut, the spindle nut is axially flanked by two spring assemblies, and a first sensor for position detection is associated with the threaded spindle, and a second sensor for position detection is associated with the spindle nut. This apparatus is characterized by its structurally simple design in which, compared to the known prior art, essentially only the spring assemblies and the second sensor must be added, the signals of which are used to determine the sensor difference in comparison with the first sensor.

Once again with regard to the simplicity of design, it is favorable for the spindle nut to be connected via support pins to an actuator ring externally slidable on the housing and associated with the second sensor, since such a design allows the use of experience gained from, and components present in, known stroke control systems.

It should be noted that for monitoring the clamped state it is not necessary to maintain a large stroke for the spindle nut within the housing; i.e. the overall length of the housing may be kept essentially unchanged, since a stroke of 1.5 mm to 5.0 mm, preferably 2.0 to 3.5 mm, within the housing is sufficient for the spindle nut.

The space requirements for the apparatus according to the invention may also be limited by providing recessed seats in the spindle nut for accommodating the spring assemblies, the recessed seats at the same time being used as a guide for the spring assemblies.

BRIEF DESCRIPTION OF THE DRAWING

The invention is explained in greater detail below with reference to a single illustrated embodiment shown in the drawings where.

SPECIFIC DESCRIPTION OF THE INVENTION

Figure 1:
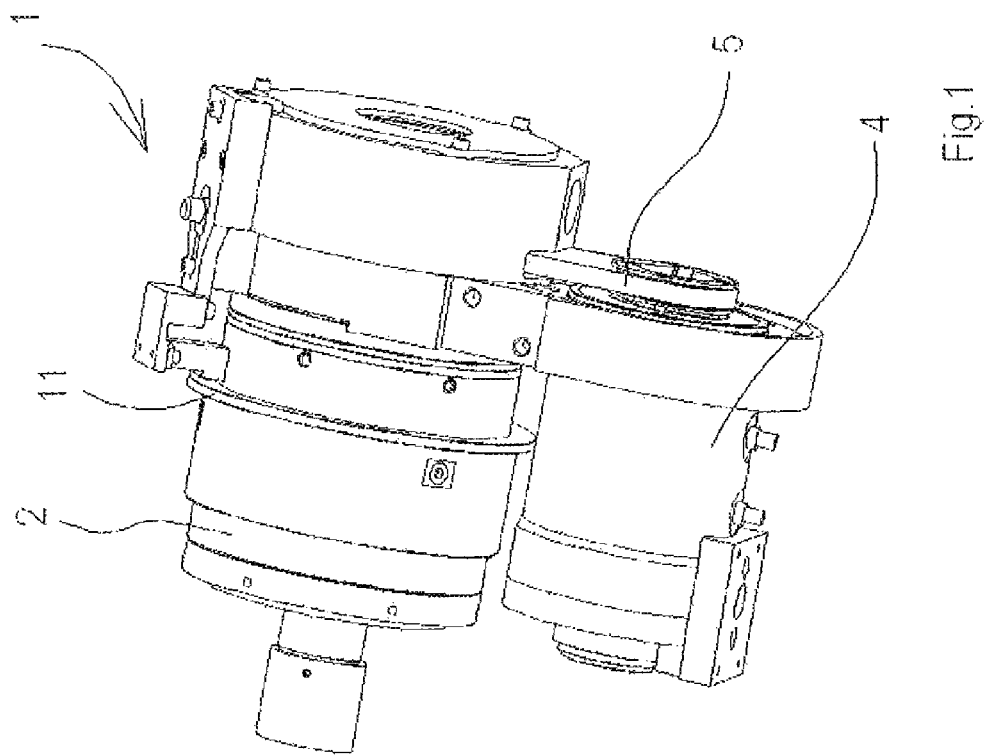
FIG. 1 is a perspective view of an electric actuator, together with a threaded spindle and a housing accommodating the spindle nut, as well as the servomotor mounted laterally next to the housing.
Figure 2:
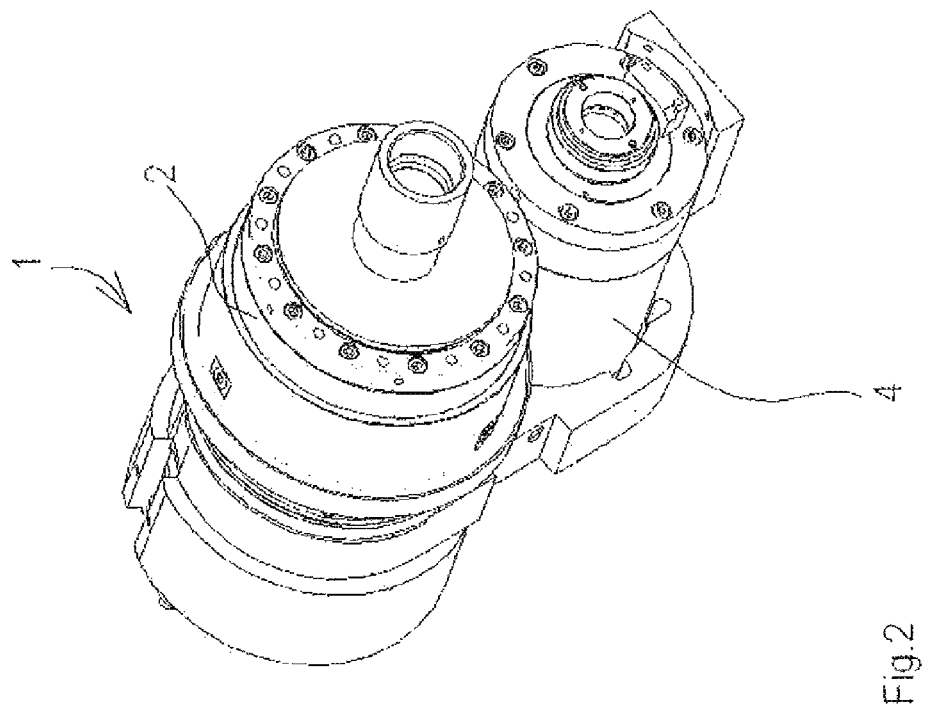
FIG. 2 is a different perspective view of the electric actuator from FIG. 1.
Figure 3:
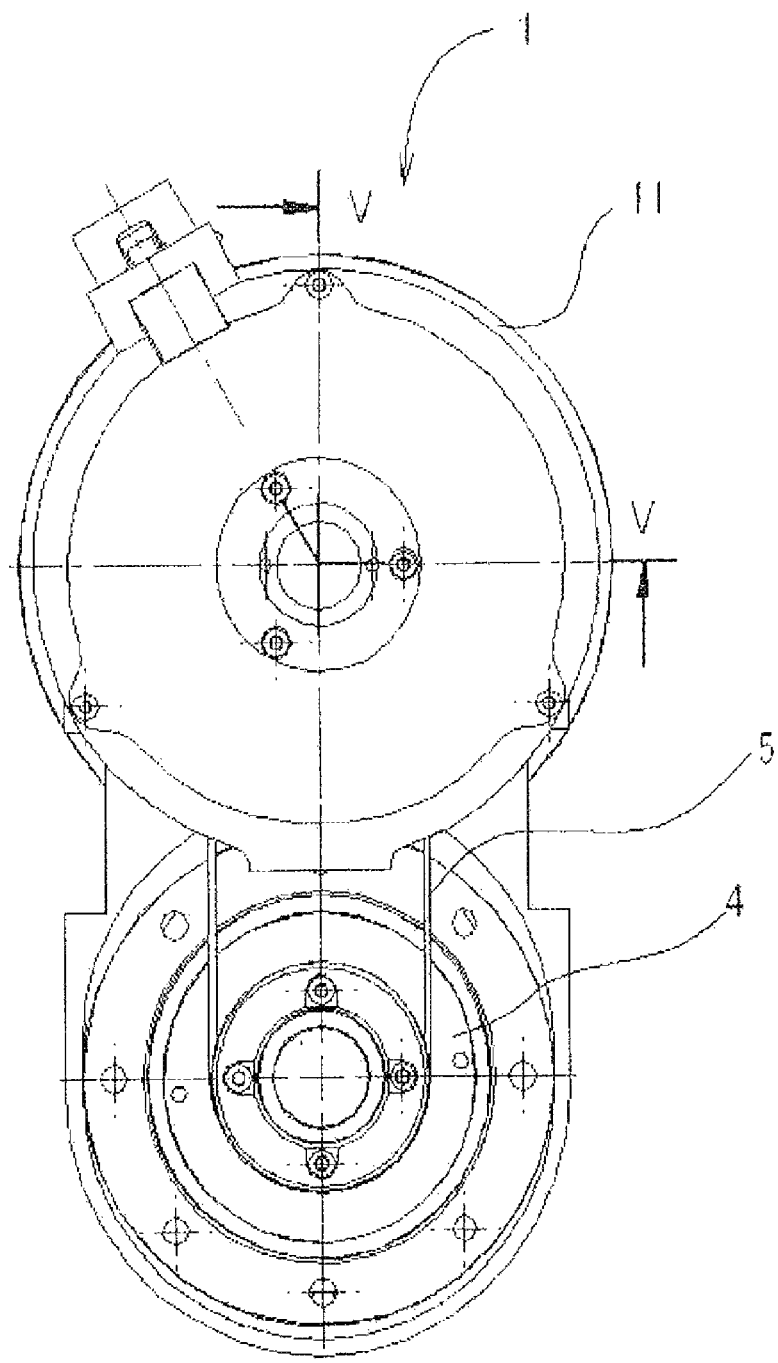
FIG. 3 is an end view of the electric actuator of FIG. 1.
Figure 4:
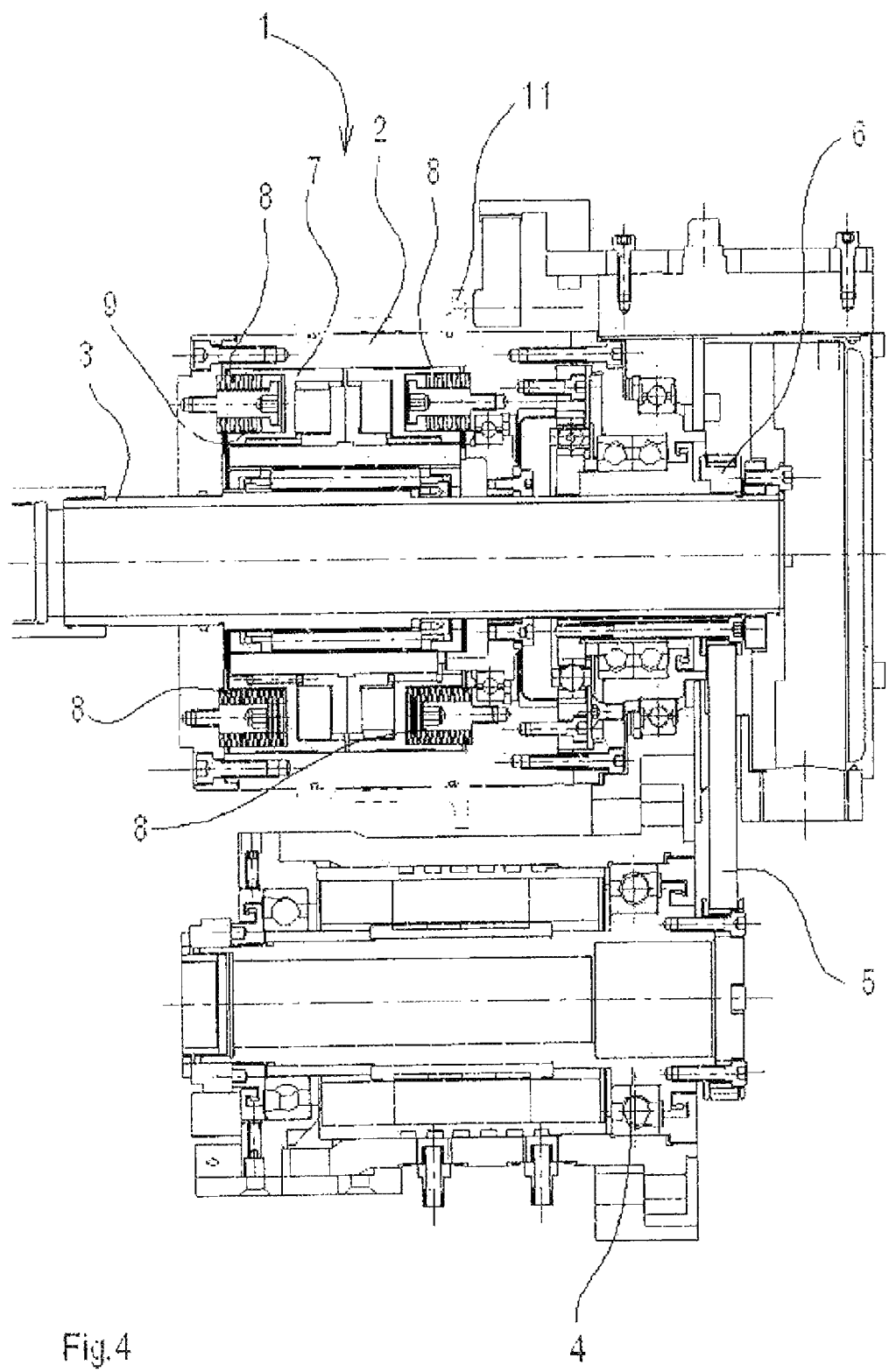
FIG. 4 is a longitudinal section through the electric actuator from FIG. 1.
Figure 5:
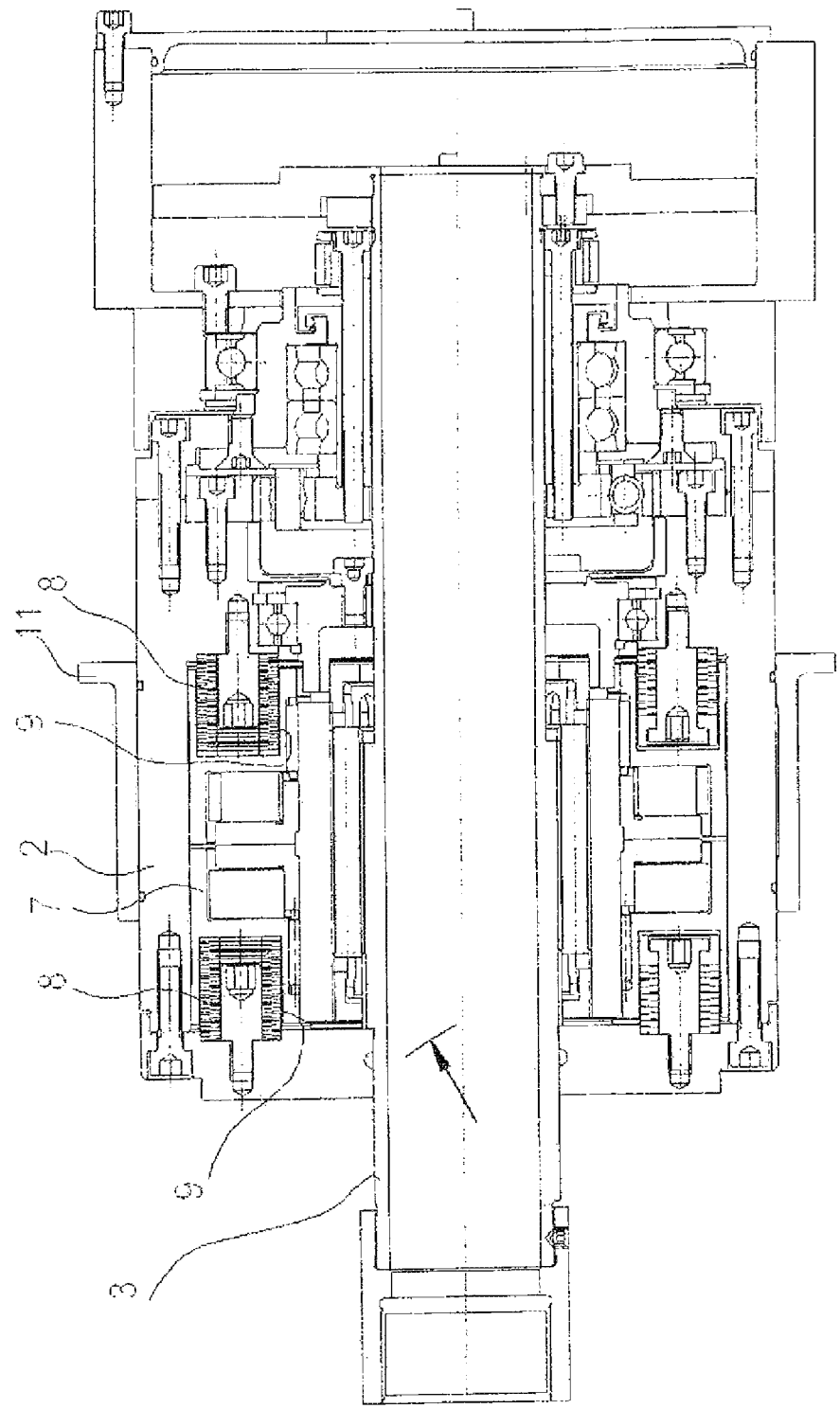
FIG. 5 is section V-V from FIG. 3.
Figure 6:
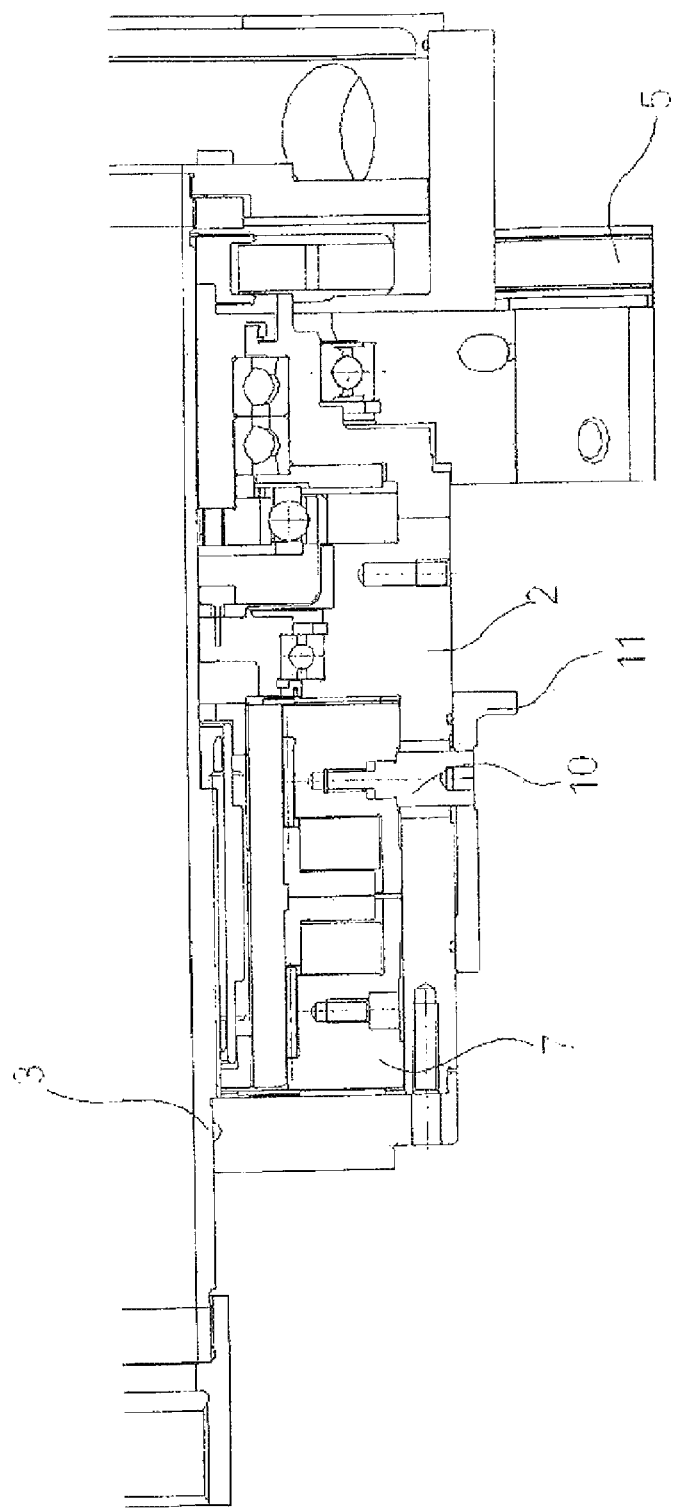
FIG. 6 is a longitudinal section of the lower half of the housing of an electric actuator, with the section plane rotated relative to that of FIG. 5.

The drawing shows an electric actuator 1 used to move the jaws of a chuck attached to a machine tool, and to continuously and safely clamp a workpiece or tool during a clamping operation. The electric actuator 1 has a housing 2 for attachment to a machine-tool work spindle and in which an axially displaceable threaded spindle 3 for moving the chuck jaws is mounted. The electric actuator 1 also includes an electric servomotor 4 mounted on the side of the housing 2. A gear-type harmonic drive is connected between the electric servomotor 4 and the threaded spindle 3, the rotor of the servomotor 4 being connected via a belt 5 to a drive pulley 6 connected to the wave generator of the harmonic drive. The circular spline of the harmonic drive is connected to the housing 2, while the flexspline of the harmonic drive drives the threaded spindle 3. In the embodiment illustrated in the drawing, the threaded spindle 3 is moved by a spindle nut 7 engaged axially between two spring stacks 8 fitted in respective recessed seats 9 of the spindle nut 7, although multiple spring assemblies 8 uniformly distributed around its periphery may be used.

The spindle nut 7 has a stroke inside the housing 2 of 2× and a minimum value of 1.5 mm; in addition, the spindle nut 7 is connected via support pins 10 to an actuator ring 11 externally slidable on the housing 2. A second sensor for position detection of the spindle nut 7 is associated with this actuator ring 11, and a first sensor for position detection is associated with the threaded spindle 3.

Figure 7:
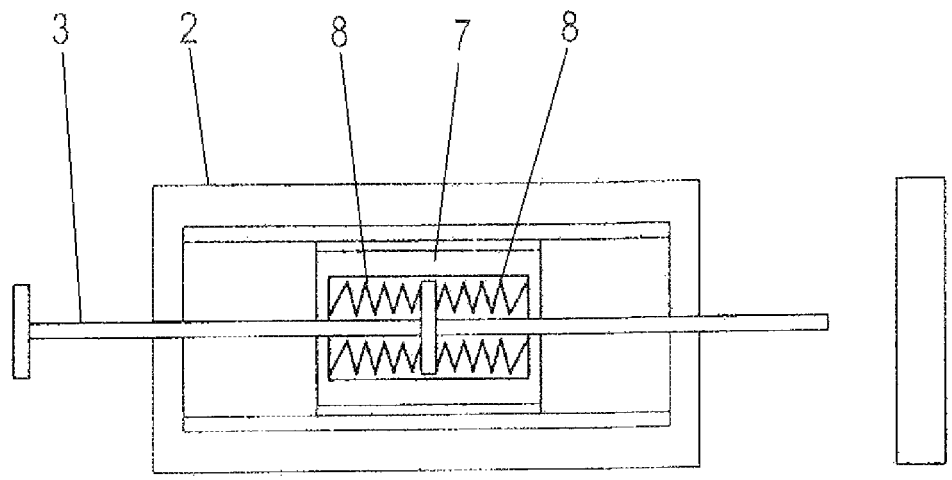
FIG. 7 is a schematic view in the idle state of the threaded spindle and the spindle nut.
Figure 8:
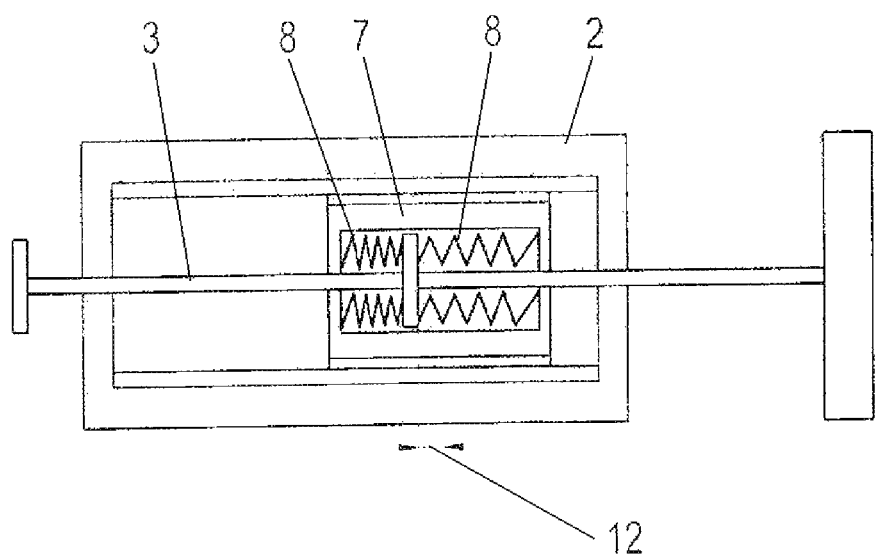
FIG. 8 is a schematic view like FIG. 7 illustrating the sensor difference in the clamped state of the electric actuator.

By use of such an electric actuator 1, a workpiece or tool may be easily clamped by positioning the tool or workpiece between the jaws of the chuck, and then initiating movement of the jaws by the electric servomotor 4 that axially displaces the threaded spindle 3. FIG. 7 shows the normal state of the electric actuator 1, in which both sensors are in their starting positions with a sensor difference of zero. When the clamping jaws first make contact with the tool or workpiece, this results in an increase in the force necessary for the continued movement of the threaded spindle 3, so that, based on this increased force, conclusions may be drawn concerning the first contact of the clamping jaws with the tool, and via the first sensor a determination may be made of the position of the threaded spindle 3. The presence of a sensor difference thus indicates that an object is clamped or that the threaded spindle 3 is encountering resistance. During the clamping operation the spindle nut 7 continues moving until the second sensor is able to determine the sensor difference 12, illustrated in FIGS. 7 and 8, which results from the continued movement of the spindle nut 7 by the electric servomotor 4. The spring assemblies are pretensioned to the correct clamping force as a result of the fixedly enclosed path. Thus, for the electric actuator 1 according to the invention control of the clamping operation is changed from a torque-dependent control to a path-dependent control, which may be evaluated in a known manner in order to provide sufficient tension. In addition, the sensor difference 12 is available for the entire duration of the clamped state, and may be used as a control variable for automatically maintaining the clamping force.

The invention claimed is:

1. An actuator system comprising:
a spindle member extending along an axis, nonrotatable about the axis, and shiftable axially;
a chuck having a part engageable by the spindle and axially shiftable thereby to grip a tool or workpiece;
a drive having an output member rotatable about the axis;
a nut threaded to one of the members;
a spring braced axially between the other of the members and the nut such that the nut and other member can move axially relative to each other when a predetermined spring force is exceeded;
first sensor means for monitoring longitudinal movement of the nut relative to the other member and for producing an output corresponding thereto;
second sensor means for monitoring longitudinal movement of the spindle member and for producing an output corresponding thereto; and
is control means for comparing the outputs and operating the drive in accordance a difference therebetween.

2. The apparatus according to claim 1, further comprising:
an actuator ring guided externally on the housing and associated with the second sensor means; and
support pins connecting the nut to the actuator ring.

3. The apparatus according to claim 1, wherein the nut can move through an axial stroke of 1.5 mm to 5.0 mm.

4. The apparatus according to claim 1, wherein the nut is formed with recessed seats for accommodating the spring.

5. The actuator system defined in claim 1, wherein the nut is threaded to the spindle member and the springs are engaged between the output member and the nut.

6. The actuator system defined in claim 1 wherein the nut is threaded to the output member and the springs are engaged between the spindle member and the nut.

* * * * *